US012613350B2

(12) United States Patent
Gonda et al.

(10) Patent No.: US 12,613,350 B2
(45) Date of Patent: Apr. 28, 2026

(54) RADIATION IMAGING APPARATUS AND RADIATION IMAGING APPARATUS SYSTEM

(71) Applicant: CANON KABUSHIKI KAISHA, Tokyo (JP)

(72) Inventors: Takaaki Gonda, Kanagawa (JP); Tomohiro Hoshina, Kanagawa (JP); Akira Kida, Kanagawa (JP); Kaito Miyashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 18/511,903

(22) Filed: Nov. 16, 2023

(65) Prior Publication Data

US 2024/0176033 A1 May 30, 2024

(30) Foreign Application Priority Data

Nov. 25, 2022 (JP) ................................. 2022-188491

(51) Int. Cl.
*G01T 1/20* (2006.01)
*G01T 1/17* (2006.01)
(52) U.S. Cl.
CPC .............. *G01T 1/2019* (2020.05); *G01T 1/17* (2013.01)
(58) Field of Classification Search
CPC ................................. G01T 1/17; G01T 1/2019
See application file for complete search history.

(56) References Cited

U.S. PATENT DOCUMENTS

| | | | | |
|---|---|---|---|---|
| 5,777,335 A * | 7/1998 | Mochizuki | ............ | G01T 1/2006 250/370.11 |
| 5,811,790 A * | 9/1998 | Endo | ..................... | H10F 30/301 257/469 |
| 5,880,403 A * | 3/1999 | Czajkowski | .......... | H01L 23/055 174/50.56 |
| 2002/0011572 A1* | 1/2002 | Kajiwara | ............ | H10F 39/8057 250/370.11 |
| 2002/0050371 A1* | 5/2002 | Czjakowski | .......... | H01L 23/055 257/E27.009 |
| 2002/0195676 A1* | 12/2002 | Hamamoto | ......... | H01L 23/4985 257/433 |

(Continued)

FOREIGN PATENT DOCUMENTS

| | | |
|---|---|---|
| JP | H09288184 A | 11/1997 |
| JP | 2007155433 A | 6/2007 |
| JP | 2010197404 A | 9/2010 |

*Primary Examiner* — Blake C Riddick
(74) *Attorney, Agent, or Firm* — Canon U.S.A., Inc. IP Division

(57) ABSTRACT

A radiation imaging apparatus includes a radiation detector, a control circuit board, a support base, a wiring circuit board, and a first shield member. The radiation detector detects radiation and the control circuit board controls the radiation detector. The support base has a first surface and a second surface opposite to the first surface and holds the radiation detector on the first surface and the control circuit board on the second surface. The wiring circuit board connects the radiation detector and the control circuit board to each other at a side surface of the support base. The wiring circuit board has a surface-mount component mounted on the wiring circuit board. The first shield member blocks the radiation and disposed between the surface-mount component and the support base.

16 Claims, 7 Drawing Sheets

(56) References Cited

U.S. PATENT DOCUMENTS

| | | | | |
|---|---|---|---|---|
| 2004/0217293 A1* | 11/2004 | Tsuchiya | G01T 1/2928 | 250/370.08 |
| 2006/0165214 A1* | 7/2006 | Mattson | G01N 23/046 | 378/19 |
| 2007/0131867 A1* | 6/2007 | Okada | G01T 1/2006 | 250/370.11 |
| 2008/0067392 A1* | 3/2008 | Miyaguchi | G01T 1/2006 | 257/E27.15 |
| 2010/0213378 A1* | 8/2010 | Matsumoto | A61B 6/4441 | 250/354.1 |
| 2012/0097857 A1* | 4/2012 | Hayatsu | G01T 1/20182 | 250/366 |
| 2012/0104271 A1* | 5/2012 | Gonda | G01T 1/244 | 250/394 |
| 2012/0112084 A1* | 5/2012 | Yamada | G01T 1/20188 | 250/370.15 |
| 2012/0126126 A1* | 5/2012 | Yokoyama | G01T 1/2928 | 250/361 R |
| 2012/0126128 A1* | 5/2012 | Watanabe | G01T 1/2928 | 250/361 R |
| 2012/0261173 A1* | 10/2012 | Shen | H05K 1/0218 | 174/257 |
| 2013/0077760 A1* | 3/2013 | Tagawa | A61B 6/4291 | 378/154 |
| 2013/0099129 A1* | 4/2013 | Sato | A61B 6/4225 | 250/394 |
| 2013/0099130 A1* | 4/2013 | Nakahashi | A61B 6/4283 | 250/394 |
| 2014/0027637 A1* | 1/2014 | Watano | G01T 1/20189 | 250/336.1 |
| 2014/0029731 A1* | 1/2014 | Mellor | G01T 1/20 | 378/146 |
| 2014/0183370 A1* | 7/2014 | Bavendiek | G01N 23/185 | 250/366 |
| 2014/0321611 A1* | 10/2014 | Cho | A61B 6/4035 | 378/20 |
| 2015/0146842 A1* | 5/2015 | Kurochi | G21F 1/00 | 250/361 R |
| 2016/0157797 A1* | 6/2016 | Tagawa | A61B 6/4233 | 378/98.2 |
| 2016/0178757 A1* | 6/2016 | Watano | A61B 6/4283 | 250/336.1 |
| 2016/0320495 A1* | 11/2016 | Ying | G01T 1/20182 | |
| 2016/0322418 A1* | 11/2016 | Leblans | G01T 1/2019 | |
| 2018/0011206 A1* | 1/2018 | Ichimura | G01T 1/2928 | |
| 2018/0136342 A1* | 5/2018 | Nakamura | G01T 1/2006 | |
| 2018/0246228 A1* | 8/2018 | Nakamura | H01L 25/042 | |
| 2018/0275290 A1* | 9/2018 | Ushikura | G01T 1/2006 | |
| 2018/0313961 A1* | 11/2018 | Ushikura | H10F 30/22 | |
| 2018/0313962 A1* | 11/2018 | Ushikura | H10F 77/10 | |
| 2018/0348382 A1* | 12/2018 | Shimba | G01T 1/202 | |
| 2019/0310383 A1* | 10/2019 | Sakuragi | A61B 6/56 | |
| 2019/0313525 A1* | 10/2019 | Nagano | H05K 1/0201 | |
| 2020/0037969 A1* | 2/2020 | Tagawa | A61B 6/4283 | |
| 2020/0309967 A1* | 10/2020 | Kondo | A61B 6/44 | |
| 2023/0015140 A1* | 1/2023 | Horiuchi | A61B 6/488 | |
| 2023/0016138 A1* | 1/2023 | Horiuchi | A61B 6/4266 | |
| 2023/0019809 A1* | 1/2023 | Horiuchi | G01T 7/00 | |
| 2023/0273329 A1* | 8/2023 | Otaki | G01T 1/244 | 250/370.08 |
| 2023/0273330 A1* | 8/2023 | Otaki | G01T 1/20 | 250/370.01 |
| 2024/0118438 A1* | 4/2024 | Yano | G01T 1/247 | |
| 2025/0314786 A1* | 10/2025 | Otaki | G01T 1/24 | |

* cited by examiner

RADIATION IMAGING APPARATUS AND RADIATION IMAGING APPARATUS SYSTEM

BACKGROUND

Field

The present disclosure relates to a radiation imaging apparatus and a radiation imaging apparatus system.

Description of the Related Art

A type of radiation imaging apparatus that employs a flat panel detector (FPD) for radiological imaging is widely used to capture still and moving images in the field of medical diagnostic imaging or nondestructive inspection.

The radiation imaging apparatus accommodates a radiation detector for detecting radiation and surface-mount components, such as integrated circuits for controlling the radiation detector. The surface-mount components may, for example, deteriorate in performance due to a long term exposure to radiation. Japanese Patent Laid-Open No. 09-288184 discloses a structure in which a shield member for blocking radiation is disposed around the surface-mount component to prevent the deterioration in performance of a surface-mount component.

The detection surface of the radiation detector may be irradiated with radiation in a direction inclined from the direction normal to the detection surface, for example, in the radiological imaging using the tomosynthesis imaging technology. Accordingly, it is necessary to protect the surface-mount component from radiation entering in an inclined direction.

In Japanese Patent Laid-Open No. H09-288184, a shield member covers the surface-mount component to protect it from radiation.

In some conventional radiation imaging apparatuses, a shield member for radiation is generally made of a high-density metal, such as lead, copper, tungsten, or molybdenum. Accordingly, the weight of the conventional radiation imaging apparatus increases as the size of the shield member increases, which poses a negative impact on the usability of such a radiation imaging apparatus when carrying and setting the apparatus.

SUMMARY

The present disclosure provides a light-weight radiation imaging apparatus that can protect surface-mount components inside the radiation imaging apparatus from radiation in a direction inclined relative to the direction normal to the detection surface.

According to an aspect of the present disclosure, a radiation imaging apparatus includes a radiation detector configured to detect radiation, a control circuit board configured to control the radiation detector, a support base having a first surface and a second surface opposite to the first surface and holding the radiation detector on the first surface and the control circuit board on the second surface, a wiring circuit board connecting the radiation detector and the control circuit board to each other at a side surface of the support base, wherein the wiring circuit board has a surface-mount component mounted on the wiring circuit board, and a first shield member configured to block the radiation and disposed between the surface-mount component and the support base.

Further features of the present disclosure will become apparent from the following description of exemplary embodiments with reference to the attached drawings.

DESCRIPTION OF THE EMBODIMENTS

First Embodiment

Figure 1:
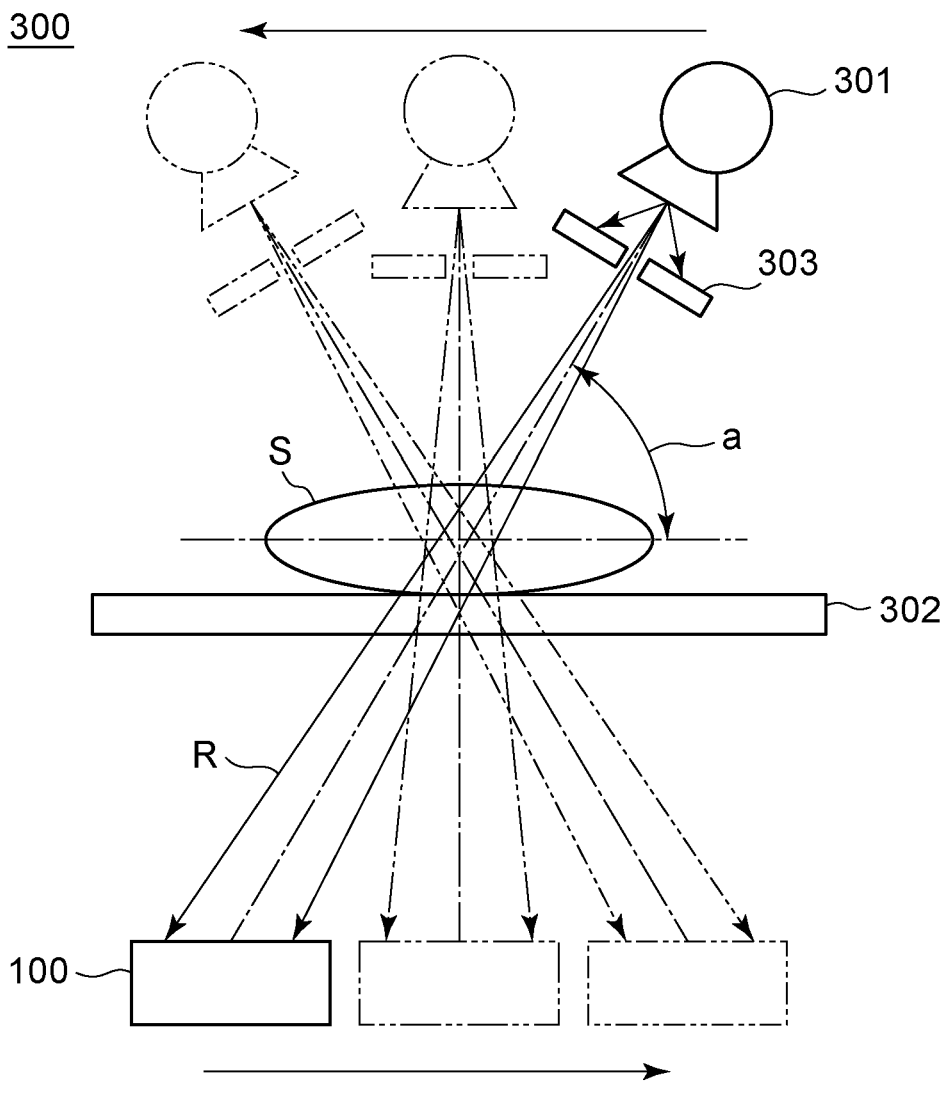
FIG. 1 is a schematic view illustrating a positional relationship of apparatuses included in a radiation imaging apparatus system according to a first embodiment.

FIG. 1 is a schematic view illustrating an example of a radiation imaging apparatus system 300 equipped with a radiation imaging apparatus 100 of the present embodiment. The radiation imaging apparatus 100 and a radiation source 301 included in the radiation imaging apparatus system 300 are held so as to oppose each other with an object S on a stage 302 being placed therebetween. A collimator 303 is normally disposed at the radiation source 301 so as to allow radiation R to pass the collimator 303. The collimator 303 can narrow the irradiation area of radiation R and prevent the object S from being irradiated with unnecessary radiation R.

When tomosynthesis imaging is performed, the radiation source 301 and the radiation imaging apparatus 100 are translated parallel to each other while the radiation source 301 swings so as to direct radiation R to the radiation imaging apparatus 100. The radiation source 301 emits radiation R and captures radiological images at predetermined irradiation angles a at which the radiation R is directed toward the object S. An arbitrary cross-sectional image can be reconstructed from these radiological images.

Figure 2:
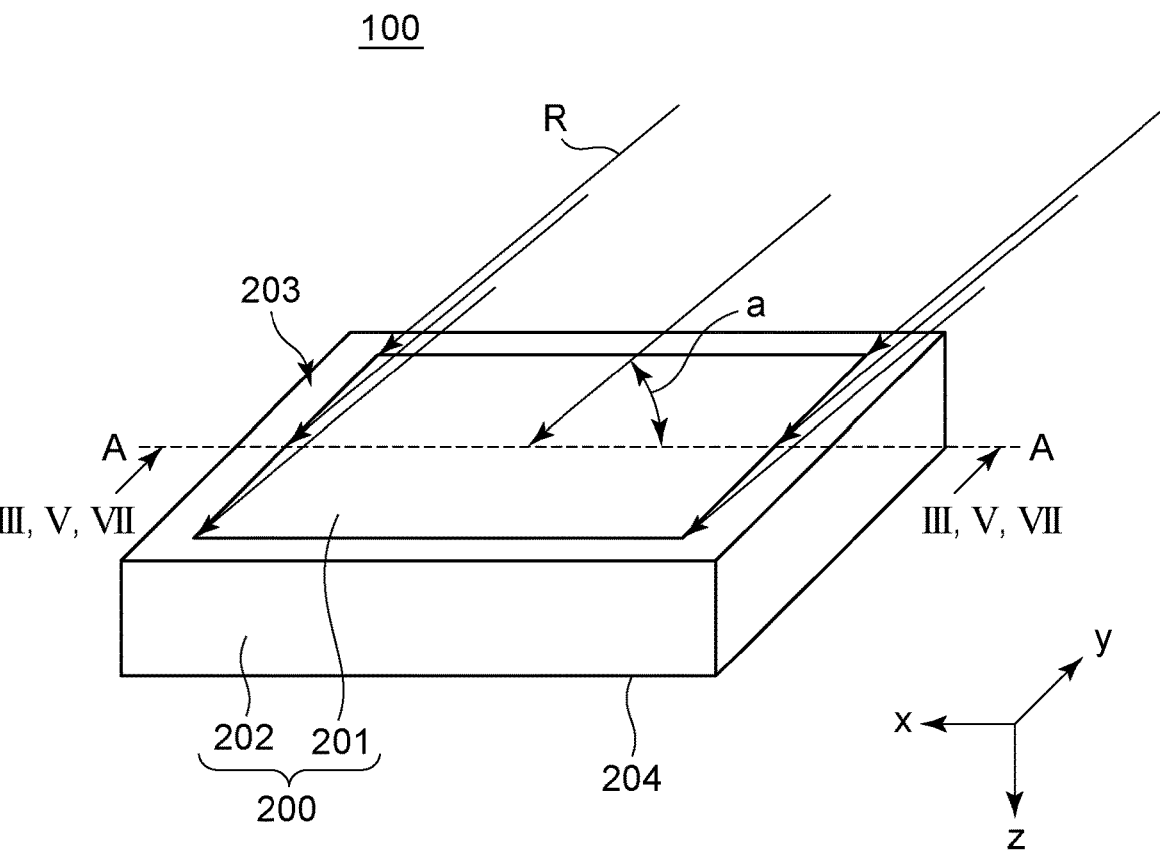
FIG. 2 is a perspective view illustrating an example of an exterior of a radiation imaging apparatus according to the first embodiment.

FIG. 2 is a perspective view illustrating an example of an exterior of the radiation imaging apparatus 100 of the present embodiment. More specifically, FIG. 2 is a perspective view illustrating the exterior of the radiation imaging apparatus 100 when a radiation-incident surface 203 of a housing 200 of the radiation imaging apparatus 100 is viewed. Radiation R is incident on the radiation-incident surface 203 at an irradiation angle a. The xyz coordinate system is illustrated in FIG. 2, in which the z direction is defined as a direction from the radiation-incident surface 203 toward a rear surface 204, which is a surface opposite to the radiation-incident surface 203, and the x direction and the y direction are defined as two directions being orthogonal to the z direction and being orthogonal to each other. In FIG. 2, line A-A extends parallel to the x direction.

The housing 200 is shaped like a cuboid and has a radiation-incident surface 203 on which radiation R is incident. A part of the radiation-incident surface 203 is the surface of a top panel 201, and the other part thereof is the surface of the exterior cover 202. The top panel 201 is made, for example, of a resin or carbon fiber reinforced plastic (CFRP), thereby increasing the transmissivity of radiation R and also increasing the rigidity.

The exterior cover 202 is made, for example, of CFRP, magnesium alloy, aluminum alloy, iron, or stainless steel to improve rigidity and keep light weight at the same time.

Figure 3:
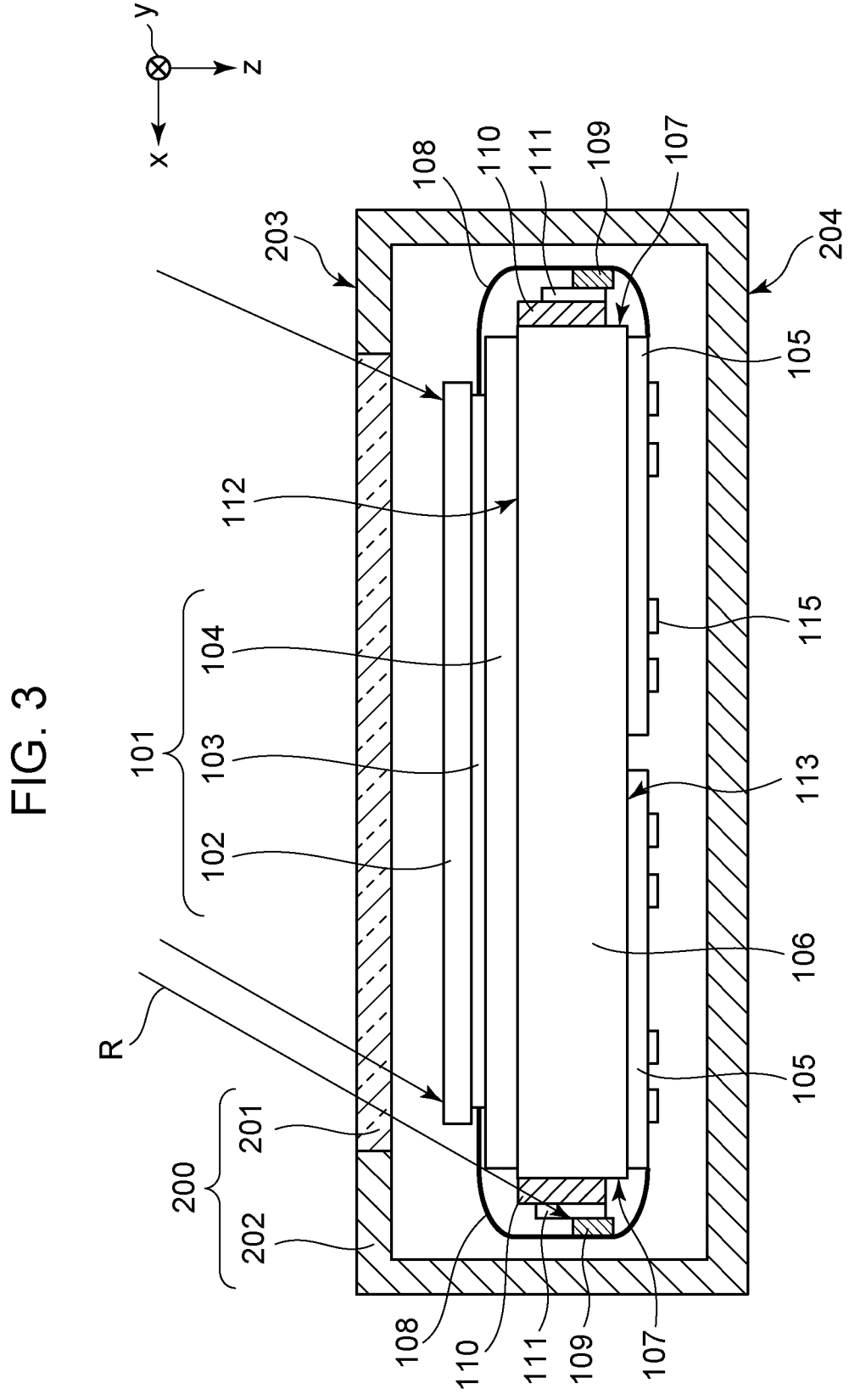
FIG. 3 is a view illustrating an example of an internal structure of the radiation imaging apparatus according to the first embodiment.

FIG. 3 is a cross-sectional view illustrating an example of an internal structure of the radiation imaging apparatus 100 of the present embodiment, the view being taken along line A-A in FIG. 2. FIG. 3 also illustrates the xyz coordinate system corresponding to that in FIG. 2.

The housing 200 of the radiation imaging apparatus 100 accommodates a radiation detector 101, a control circuit board 105, and a wiring circuit board 108. The radiation detector 101 detects radiation R and generates electric signals for radiological imaging. The control circuit board 105 controls the radiation detector 101, and the wiring circuit board 108 connects the radiation detector 101 to the control circuit board 105. The radiation detector 101 at least includes a scintillator 102 that emits visible light in response to radiation R being incident thereon, a wiring layer 103 for photoelectric conversion elements that generate electric charges in response to the amount of scintillation light, and an insulating substrate 104 on which the wiring layer 103 is formed.

For example, the control circuit board 105 is an electric circuit board that controls the radiation detector 101, processes radiological images, performs communication between the radiation imaging apparatus 100 and the radiation imaging apparatus system 300, and converts external electric power to driving power for control and communication. Surface-mount components 115, such as integrated circuits (IC) to perform the above control and communication, are mounted on the surface of the control circuit board 105.

The housing 200 also accommodates a support base 106 that holds the radiation detector 101 and the control circuit board 105. The support base 106 has a radiation-incident surface 112 (i.e., a first surface) on which radiation R is incident and a rear surface 113 (i.e., a second surface) positioned opposite to the radiation-incident surface 112. The radiation detector 101 is disposed on the radiation-incident surface 112, and the control circuit board 105 is disposed on the rear surface 113. The support base 106 is made, for example, of resin, CFRP, magnesium alloy, aluminum alloy, iron, or stainless steel so as to improve rigidity and keep light weight at the same time. The support base 106 may be made of multiple components.

The wiring circuit board 108 is disposed on a support-base side surface 107, which is a side surface of the support base 106 that adjoins the radiation-incident surface 112. A flexible printed circuit board, based on a flexible film made of polyimide or the like, can be used for the wiring circuit board 108 in combination with the "chip on film" (COF) technology, which enables easy wiring between the radiation detector 101 and the control circuit board 105 inside the housing 200.

A wiring board-mount component 109, such as a driver IC that transmits electric signals for driving the radiation detector 101 or an amplifier IC that amplifies electric signals detected by the radiation detector 101, is mounted on the surface of the wiring circuit board 108. The wiring board-mount component 109 is mounted on the wiring circuit board 108 at a position near the radiation detector 101. With this arrangement, the wiring board-mount component 109 is less likely to be affected by external electromagnetic noise from the outside of the radiation imaging apparatus 100, thereby improving the performance of the radiation detector 101 and the quality of radiological image.

The wiring board-mount component 109 is a semiconductor integrated circuit, which is vulnerable to a deterioration in performance or breakage due to repeated exposure to radiation R. When radiation R enters the housing 200 through the top panel 201 at an irradiation angle a, the radiation R is more likely to come to the side of the support-base side surface 107 (deeper in the x direction) where the wiring board-mount component 109 is disposed, compared with the case where radiation R enters the housing 200 vertically (in the z direction).

In order to protect the wiring board-mount component 109 from radiation R entering in an inclined direction, a first shield member 110 is disposed between the wiring board-mount component 109 and the support-base side surface 107. The first shield member 110 is made of a high-density material, such as lead, copper, tungsten, or molybdenum, and can block radiation R.

The first shield member 110 is fixed to the support-base side surface 107 using a double-sided adhesive tape, an adhesive, screws, or the like. The first shield member 110 is not directly fixed to the wiring circuit board 108 nor to the wiring board-mount component 109, which can prevent breakage occurring due to the weight of the first shield member 110 when an external impact is applied to the radiation imaging apparatus 100.

The first shield member 110 extends at least from the position of the wiring board-mount component 109 toward the radiation-incident surface 112 of the support base 106 (toward the negative z side in the z direction). The wiring board-mount component 109 can be thereby protected from radiation R being incident on the radiation-incident surface 112 in an inclined direction.

A cushioning member 111 is also disposed between the wiring board-mount component 109 and the first shield member 110. The cushioning member 111 prevents the wiring board-mount component 109 from colliding against the first shield member 110 when an external impact is applied to the radiation imaging apparatus 100. The size of the housing 200 can be reduced by positioning the first shield member 110 and the wiring board-mount component 109 closely to each other.

Figure 4:
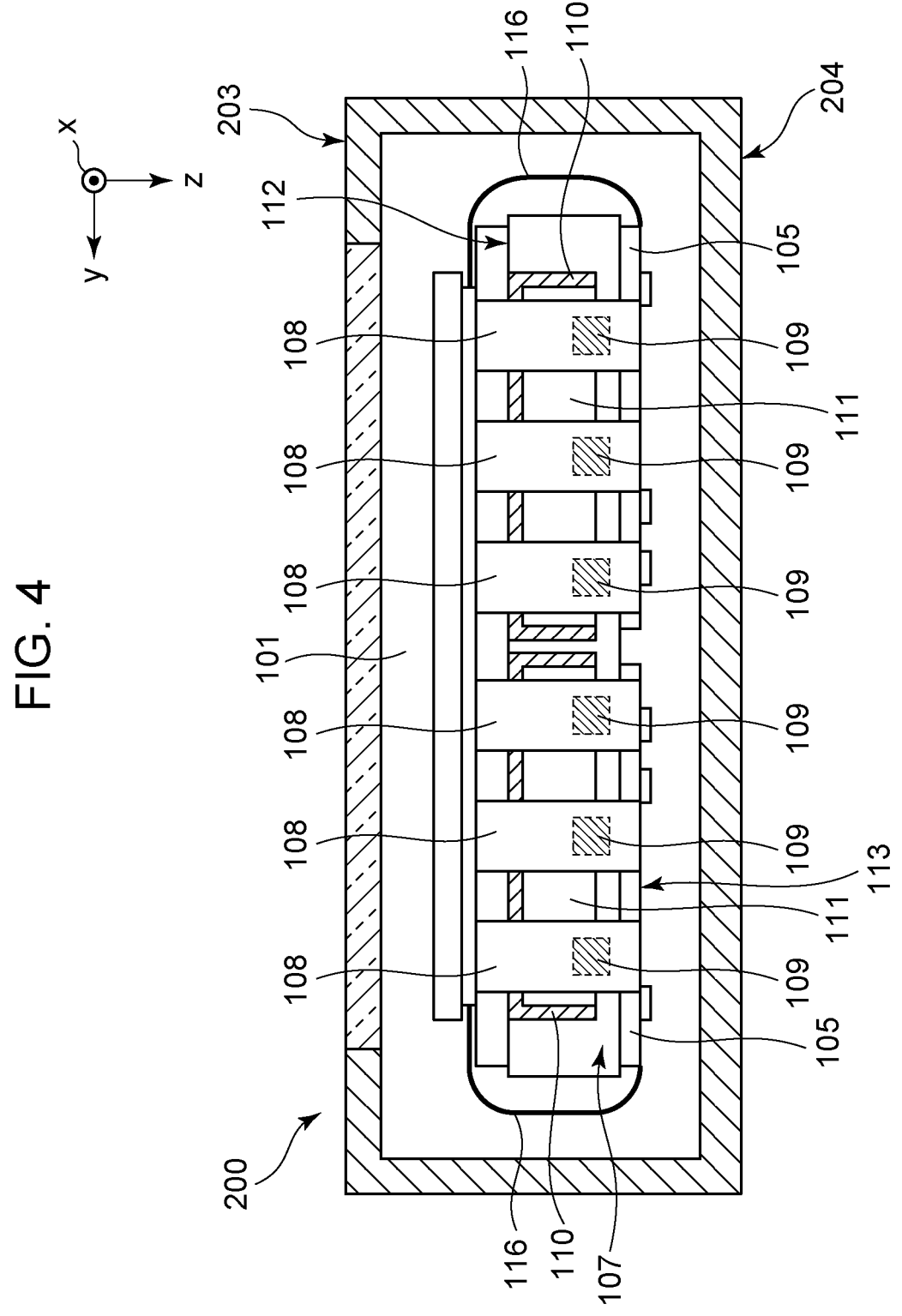
FIG. 4 is a view illustrating an example of the internal structure of the radiation imaging apparatus according to the first embodiment.

FIG. 4 is a view illustrating an example of the internal structure of the radiation imaging apparatus according to the present embodiment as viewed in a direction normal to the support-base side surface 107 in FIG. 3. FIG. 4 also illustrates the xyz coordinate system corresponding to that in FIG. 2.

Multiple wiring circuit boards 108 having respective wiring board-mount components 109 thereon are disposed so as to be arranged in a direction parallel to the radiation-incident surface 112 and the support-base side surface 107 of the support base 106 (i.e., in the y direction). Provision of multiple wiring board-mount components 109 in the radiation detector 101 is advantageous because this can reduce the amount of wiring per each wiring board-mount component 109, the wiring including control wiring for driving the photoelectric conversion elements and signal wiring for transmitting generated electric charges. Accordingly, the cost and the yield of wiring board-mount components 109 can be improved in manufacturing.

As is the case for the wiring circuit boards 108, multiple first shield members 110 are disposed so as to be arranged in a direction parallel to the radiation-incident surface 112 and to the support-base side surface 107 of the support base 106 (i.e., in the y direction). Each first shield member 110 is disposed so as to cover at least the entire width (in the y direction) of the corresponding wiring board-mount component 109 when the support-base side surface 107 is viewed in the normal direction. Accordingly, the size of each first shield member 110 can be reduced as much as possible within the range in which the first shield member 110 can protect the wiring board-mount component 109 from radiation R, which leads to a reduction in the weight of the radiation imaging apparatus 100.

Second Embodiment

Figure 5:
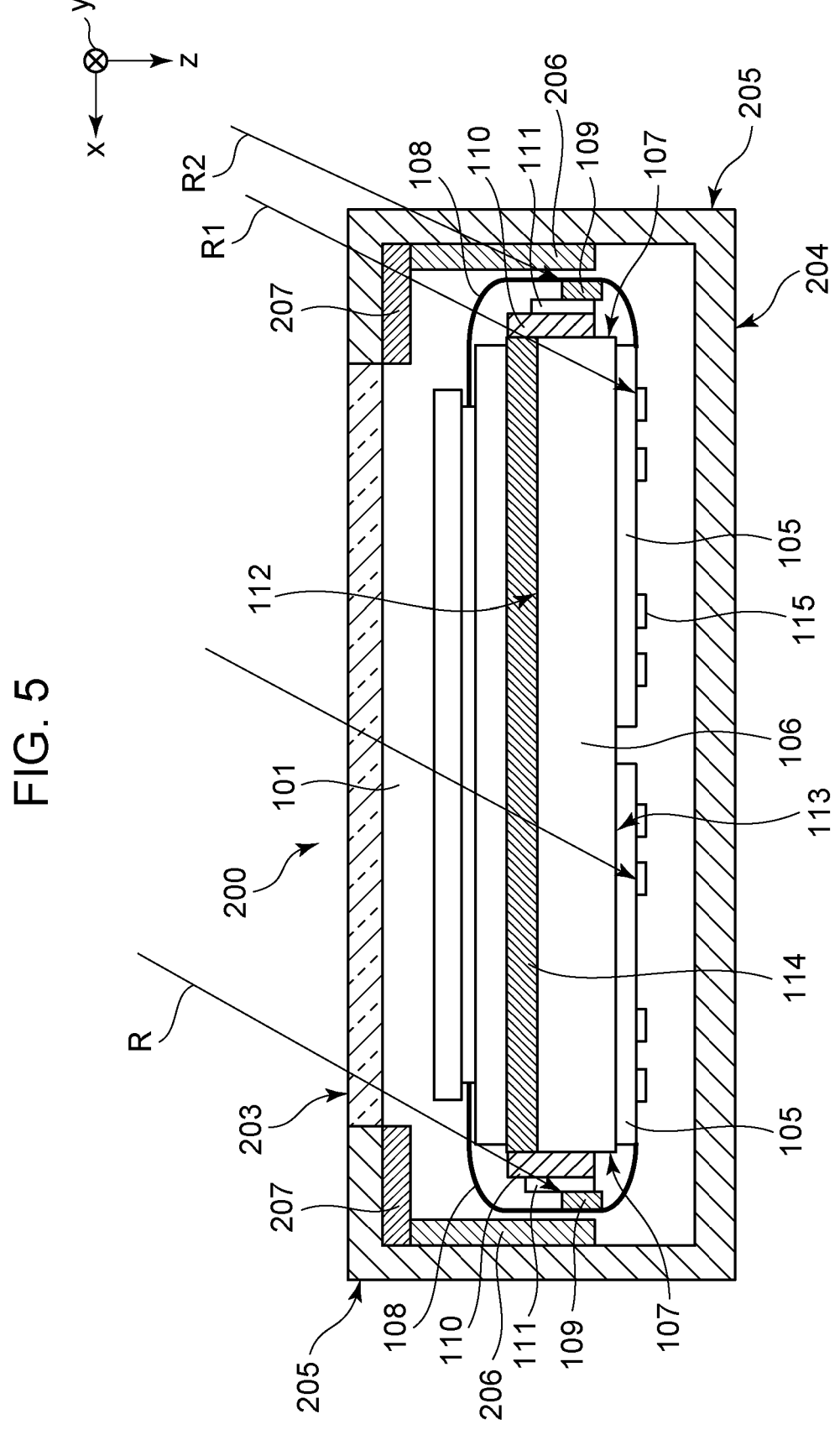
FIG. 5 is a view illustrating an example of an internal structure of a radiation imaging apparatus according to a second embodiment.
Figure 6:
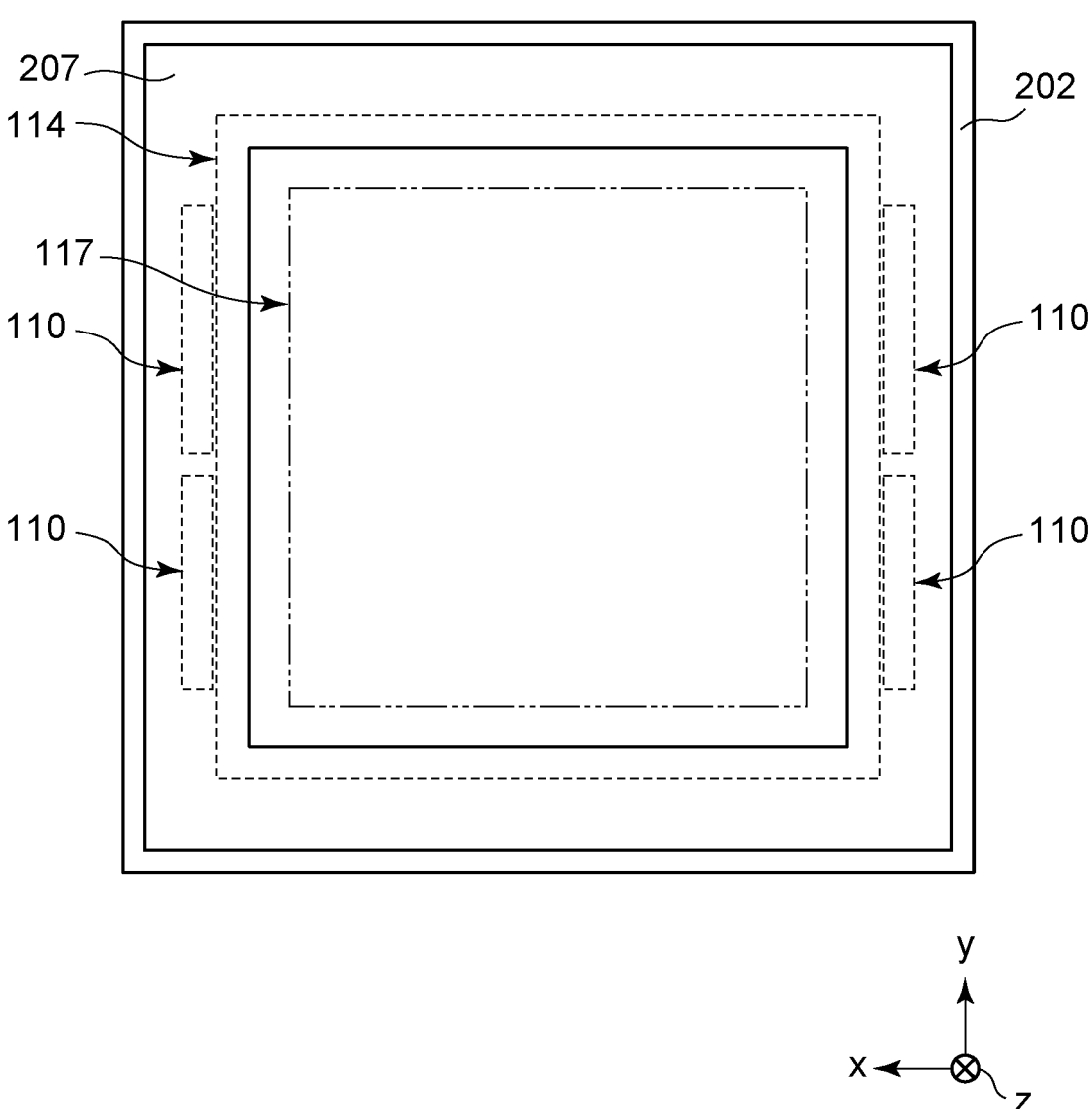
FIG. 6 is a view illustrating an example of the internal structure of the radiation imaging apparatus according to the second embodiment.

FIG. 5 is a cross-sectional view illustrating an example of an internal structure of a radiation imaging apparatus according to a second embodiment, the view being taken along line A-A in FIG. 2. FIG. 6 is a view illustrating the internal structure of the radiation imaging apparatus of the present embodiment as viewed in the direction normal to the radiation-incident surface 203 in FIG. 2. An example of an area of a shield member is illustrated in the internal structure of the radiation imaging apparatus. FIGS. 5 and 6 also illustrate the xyz coordinate system corresponding to that in FIG. 2.

A second shield member 114 is disposed between the radiation detector 101 and the control circuit board 105. FIG. 5 illustrates an example in which the second shield member 114 is disposed between the radiation detector 101 and the radiation-incident surface 112. The second shield member 114, however, can be disposed between the control circuit board 105 and the rear surface 113.

The second shield member 114 is made of the same material as that of the first shield member 110 and accordingly can block radiation R. Accordingly, the second shield member 114 can shield the surface-mount components 115 on the control circuit board 105 from radiation R. The first shield member 110 and the second shield member 114 can be formed integrally, which can reduce the number of components of the radiation imaging apparatus 100 and reduce the cost of the apparatus.

A third shield member 206 is disposed on the inside surface of a housing side wall 205 that opposes the support-base side surface 107 and adjoins the radiation-incident surface 203 of the housing 200. A fourth shield member 207 is disposed on an inside surface of the housing 200 at a position opposite to the radiation-incident surface 203. The third shield member 206 and the fourth shield member 207 are made of the same material as that of the first shield member 110 and accordingly can block radiation R.

The third shield member 206 extends at least from the position of the wiring board-mount component 109 toward the radiation-incident surface 203 of the housing 200 (toward the negative z side in the z direction). The wiring board-mount component 109 can be thereby protected from radiation R being incident on the radiation-incident surface 203 in an inclined direction.

When the radiation-incident surface 203 of the housing 200 is viewed in the normal direction, the fourth shield member 207 is disposed outside a detection area 117 of the radiation detector 101, which enables radiation R to enter the radiation detector 101 without being blocked.

The radiation imaging apparatus system 300 to be used for nondestructive inspection does not need to narrow the irradiation area of radiation R because the object S is an electric circuit board or component. In this case, the radiation imaging apparatus system 300 is not necessarily equipped with the collimator 303. In the case of the irradiation area of radiation R being not narrowed, the housing side wall 205 and a part of the radiation-incident surface 203 positioned outside the top panel 201 in the housing 200 are irradiated with radiation R1 and R2. The third shield member 206 and the fourth shield member 207, however, can protect the integrated circuits inside the radiation imaging apparatus 100 from the radiation R1 and R2.

The third shield member 206 and the fourth shield member 207 can be formed integrally, which can reduce the number of components of the radiation imaging apparatus 100 and reduce the cost of the apparatus.

When the radiation-incident surface 203 of the housing 200 is viewed in the normal direction, the second shield member 114 extends to the outside of the detection area 117 of the radiation detector 101, and the peripheral portion of the second shield member 114 overlaps the fourth shield member 207 at four sides. Accordingly, the second shield member 114 and the fourth shield member 207 blocks radiation R being incident on the radiation-incident surface 203 vertically (in the z direction) on the housing side wall 205 and prevents the radiation R from reaching the rear surface 113 of the support base 106 behind the second shield member 114.

Third Embodiment

Figure 7:
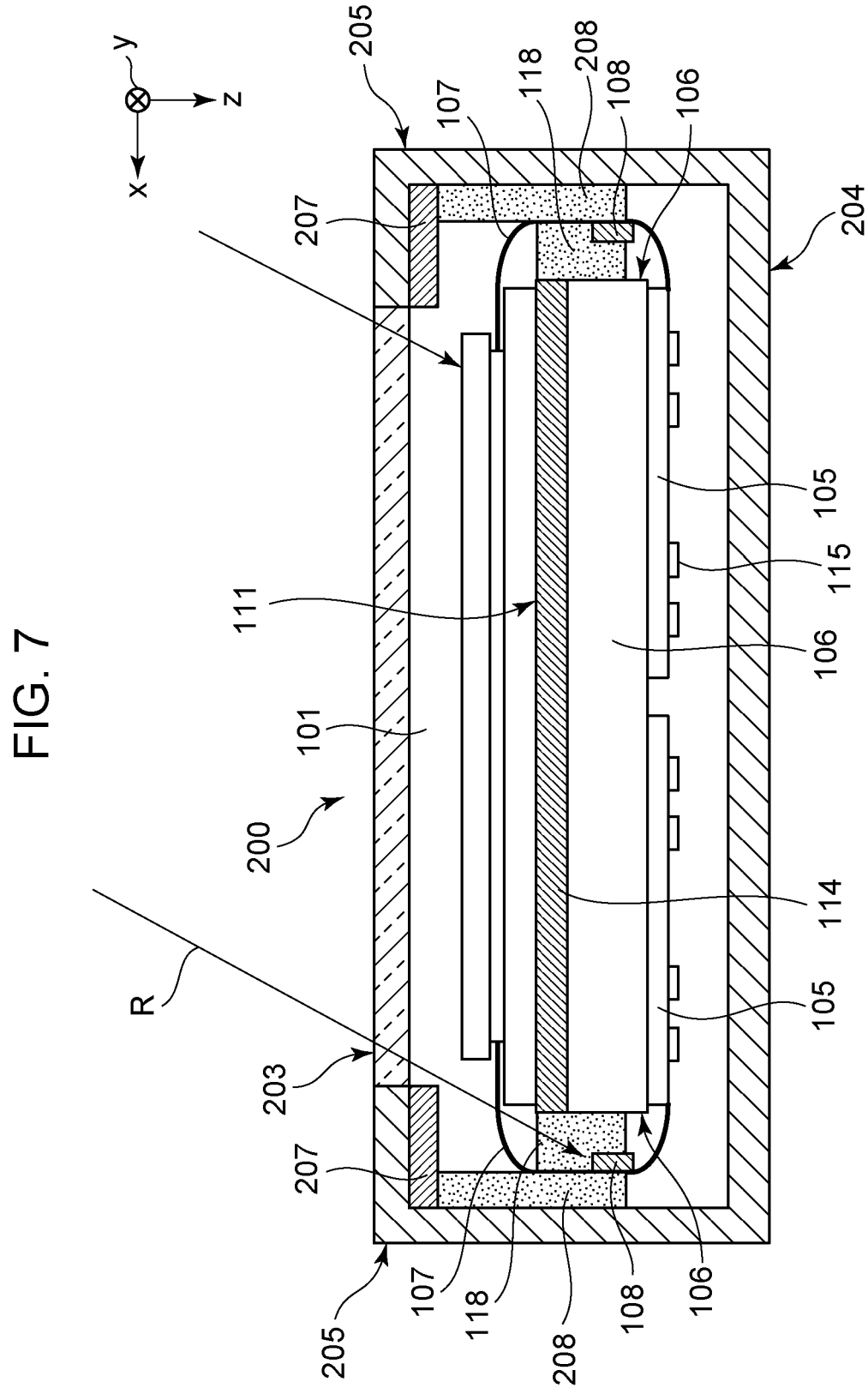
FIG. 7 is a view illustrating an example of an internal structure of a radiation imaging apparatus according to a third embodiment.

FIG. 7 is a cross-sectional view illustrating an example of an internal structure of a radiation imaging apparatus according to a third embodiment, the view being taken along line A-A in FIG. 2. FIG. 7 also illustrates the xyz coordinate system corresponding to that in FIG. 2. A shielding cushion member 118 is disposed between the wiring board-mount component 109 and the support-base side surface 107. A shielding cushion member 208 is also disposed on the inside surface of the housing side wall 205 that opposes the support-base side surface 107 and adjoins the radiation-incident surface 203 of the housing 200.

The shielding cushion members 118 and 208 are made of an elastic material capable of blocking radiation R, such as rubber or foam plastics containing a powder of, for example, lead, copper, tungsten, molybdenum, or carbon nanotube.

The wiring circuit board 108 and the wiring board-mount component 109 are sandwiched and thereby held by the shielding cushion members 118 and 208. This can prevent the wiring circuit board 108 and the wiring board-mount component 109 from vibrating when an external impact is applied to the radiation imaging apparatus 100, which can prevent deterioration of the quality of radiological image and breakage of the wiring board-mount component 109. The shielding cushion members 118 and 208 are disposed at positions close to the wiring board-mount component 109, which can reduce the size of the housing 200.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-188491, filed Nov. 25, 2022, which is hereby incorporated by reference herein in its entirety.

What is claimed is:

1. A radiation imaging apparatus comprising:
a radiation detector configured to detect radiation;
a control circuit board configured to control the radiation detector;
a support base having a first surface and a second surface opposite to the first surface and holding the radiation detector on the first surface and the control circuit board on the second surface;
a wiring circuit board connecting the radiation detector and the control circuit board to each other at a side surface of the support base, wherein the wiring circuit board has a surface-mount component mounted on the wiring circuit board; and
a first shield member configured to block the radiation and disposed between the surface-mount component and the support base.

2. The radiation imaging apparatus according to claim 1, wherein the first shield member is positioned closer than the surface-mount component to an incident surface of the radiation detector on which the radiation is incident.

3. The radiation imaging apparatus according to claim 1, further comprising a cushioning member disposed between the surface-mount component and the first shield member.

4. The radiation imaging apparatus according to claim 1, further comprising:
multiple wiring members, each including the wiring circuit board; and
multiple shield members, each including the first shield member.

5. The radiation imaging apparatus according to claim 1, wherein the first shield member is positioned closer than the surface-mount component to an incident surface of the radiation detector on which the radiation is incident and covers the surface-mount component.

6. The radiation imaging apparatus according to claim 1, further comprising a second shield member configured to block the radiation and disposed between the radiation detector and the control circuit board.

7. The radiation imaging apparatus according to claim 1, wherein the first shield member includes a first portion disposed between the surface-mount component and the support base and a second portion disposed between the radiation detector and the control circuit board.

8. The radiation imaging apparatus according to claim 1, further comprising:
a housing accommodating the radiation detector, the control circuit board, the wiring circuit board, and the support base; and
a third shield member configured to block the radiation and disposed between an inside surface of a side wall of the housing and the surface-mount component.

9. The radiation imaging apparatus according to claim 8, wherein the third shield member is positioned closer than the surface-mount component to an incident surface of the radiation detector on which the radiation is incident.

10. The radiation imaging apparatus according to claim 8, further comprising a fourth shield member configured to block the radiation and disposed on a part of an inside surface of a wall of the housing through which radiation enters.

11. The radiation imaging apparatus according to claim 10, wherein the part of the inside surface does not overlap a detection area of the radiation detector as viewed in an incident direction of the radiation.

12. The radiation imaging apparatus according to claim 10, further comprising a second shield member configured to block the radiation and disposed between the radiation detector and the control circuit board,
wherein the fourth shield member is disposed so as to overlap the second shield member as viewed in an incident direction of the radiation.

13. The radiation imaging apparatus according to claim 8, wherein the third shield member includes a third portion and a fourth portion, and
wherein the third portion is disposed between the surface-mount component and the inside surface of the side wall of the housing, and the fourth portion is disposed on a part of an inside surface of a wall of the housing through which the radiation enters.

14. The radiation imaging apparatus according to claim 8, wherein the third shield member has elasticity and holds the wiring circuit board by sandwiching at least part of the wiring circuit board.

15. The radiation imaging apparatus according to claim 1, wherein the first shield member has elasticity and holds the wiring circuit board by sandwiching at least part of the wiring circuit board.

16. A radiation imaging apparatus system comprising:
a radiation imaging apparatus; and
a radiation source,
wherein the radiation imaging apparatus includes:
a radiation detector configured to detect radiation,
a control circuit board configured to control the radiation detector,
a support base having a first surface and a second surface opposite to the first surface and holding the radiation detector on the first surface and the control circuit board on the second surface,
a wiring circuit board connecting the radiation detector and the control circuit board to each other at a side surface of the support base, wherein the wiring circuit board has a surface-mount component mounted on the wiring circuit board, and
a first shield member configured to block the radiation and disposed between the surface-mount component and the support base.

* * * * *